United States Patent
Krishnaswamy et al.

(10) Patent No.: US 8,836,033 B1
(45) Date of Patent: Sep. 16, 2014

(54) METHOD AND APPARATUS FOR REMOVING METALLIC NANOTUBES WITHOUT TRANSFERRING CARBON NANOTUBES FROM ONE SUBSTRATE TO ANOTHER SUBSTRATE

(75) Inventors: Silai Krishnaswamy, Monroeville, PA (US); Joseph Payne, Elkridge, MD (US); Jeffrey Hartman, Severn, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 94 days.

(21) Appl. No.: 13/357,796

(22) Filed: Jan. 25, 2012

(51) Int. Cl.
  *G02B 5/30* (2006.01)
(52) U.S. Cl.
  USPC .... 257/352; 438/459; 438/458; 257/E21.567; 257/E29.242; 257/E21.568; 977/742
(58) Field of Classification Search
  USPC .............................................. 501/53; 257/66
  See application file for complete search history.

(56) References Cited

U.S. PATENT DOCUMENTS

| | | | |
|---|---|---|---|
| 2003/0066625 A1* | 4/2003 | Kirshberg et al. | 165/80.3 |
| 2008/0119346 A1* | 5/2008 | Otsuka et al. | 501/53 |
| 2010/0133511 A1* | 6/2010 | Zhou et al. | 257/24 |

* cited by examiner

*Primary Examiner* — David Vu
*Assistant Examiner* — Jonathan Han
(74) *Attorney, Agent, or Firm* — Andrews Kurth LLP; Sean S. Wooden; Matthew J. Esserman

(57) ABSTRACT

Embodiments of a method and apparatus for removing metallic nanotubes without transferring CNTs from one substrate to another substrate provide two methods of transferring a thin layer of crystalline ST-cut quartz wafer to the surface of a carrier silicon wafer for subsequent CNT growth, without resorting to CNT transfer. In other words, embodiments of a method and apparatus allow CNTs to be grown on the same substrate that metallic nanotube removal is performed, therefore eliminating the costly and messy step of transferring CNTs from one substrate to another. This is achieved through a residual thin layer of crystalline ST-cut quartz layer on a silicon wafer. The ST-cut quartz wafer promotes aligned growth of CNTs, while the underlying silicon wafer allows backgate burnout.

12 Claims, 10 Drawing Sheets

US 8,836,033 B1

METHOD AND APPARATUS FOR REMOVING METALLIC NANOTUBES WITHOUT TRANSFERRING CARBON NANOTUBES FROM ONE SUBSTRATE TO ANOTHER SUBSTRATE

BACKGROUND

Carbon nanotube (CNT) field effect transistors (FETs) are promising candidates for future radio frequency (RF) applications because CNT FETs simultaneously offer high speed, high linearity, low power, and low noise attributes due to their unique one-dimensional semiconductor characteristics.

When grown using a standard high-temperature chemical vapor deposition (CVD) based process, one third of the nucleating CNTs are metallic nanotubes whereas two thirds are semi-conducting nanotubes. Because the metallic nanotubes have conductance without having any transconductance, the metallic nanotubes are undesirable from a device standpoint, and should be removed. The standard method of removing these metallic nanotubes is to place or grow the CNTs on a thin oxide coating on a conductive wafer. In the current technology, this process includes two parts. First, CNTs are grown in dense, aligned arrays on ST-cut quartz wafers using a standard, high temperature CVD growth process. Second, the CNTs are taken from their growth substrate and transferred to the conductive wafer using a complicated and messy CNT transfer process. The conductive wafer is then used as a global backgate to deplete the semi-conducting nanotubes before passing a large current through the metallic nanotubes. In an oxygen environment, this high current will oxidize the metallic nanotubes, leaving behind most of the depleted semi-conducting nanotubes.

Because CNT transfer is difficult, messy, and of questionable manufacturability, a method to avoid the CNT transfer process is preferred.

SUMMARY

An embodiment of a method is disclosed for removing metallic nanotubes without transferring carbon nanotubes (CNTs) from one substrate to another substrate. An embodiment of the method includes implanting one or more different ions into a crystalline quartz wafer, and bonding the crystalline quartz wafer to a silicon wafer. The implanted surface of the crystalline quartz wafer is bonded to the top surface of the silicon wafer. An embodiment of the method further includes heating the crystalline quartz wafer and the silicon wafer to allow the crystalline quartz wafer to cleave and break along an implant profile of the one or more different ions, depositing catalyst and growing CNTs on the top surface of the crystalline quartz wafer, depositing a source contact and a drain contact on the CNTs on the top surface of the crystalline quartz wafer, depositing a backgate on the bottom surface of the crystalline silicon wafer, and removing metallic nanotubes of the CNTs using a backgate electrical burnout process. The CNTs are grown on a same substrate that metallic nanotube removal is performed, eliminating the process of transferring the CNTs from one substrate to another substrate.

An embodiment of another method is disclosed for removing metallic nanotubes without transferring CNTs from one substrate to another substrate. An embodiment of the method includes bonding a quartz wafer to a silicon wafer. The bottom surface of the quartz wafer is bonded to the top surface of the silicon wafer. An embodiment of the method further includes grinding and lapping the quartz wafer until the quartz wafer becomes a thin layer with a thickness of less than 100 microns, etching the quartz wafer until the quartz wafer has a thickness of less than 10 microns, depositing catalyst and growing CNTs on the top surface of the quartz wafer, depositing a source contact and a drain contact on the CNTs on the top surface of the quartz wafer, depositing a backgate on the bottom surface of the silicon wafer, and removing metallic nanotubes of the CNTs using a backgate electrical burnout process. The CNTs are grown on a same substrate that metallic nanotube removal is performed, eliminating the process of transferring the CNTs from one substrate to another substrate.

An embodiment of an apparatus is disclosed for removing metallic nanotubes without transferring CNTs from one substrate to another substrate. An embodiment of the apparatus includes a silicon wafer, a thin layer of quartz wafer bonded to the silicon wafer on the top surface of the silicon wafer, CNTs grown on the thin layer of quartz wafer, a source contact and a drain contact deposited on the CNTs, and a metallic gate deposited on the bottom surface of the silicon wafer. Metallic nanotubes of the CNTs are removed using a backgate electrical burnout process, and wherein the CNTs are grown on a same substrate that metallic nanotube removal is performed, eliminating the process of transferring the CNTs from one substrate to another substrate.

DESCRIPTION OF THE DRAWINGS

The detailed description will refer to the following drawings, wherein like numerals refer to like elements, and wherein.

DETAILED DESCRIPTION

Figure 1:
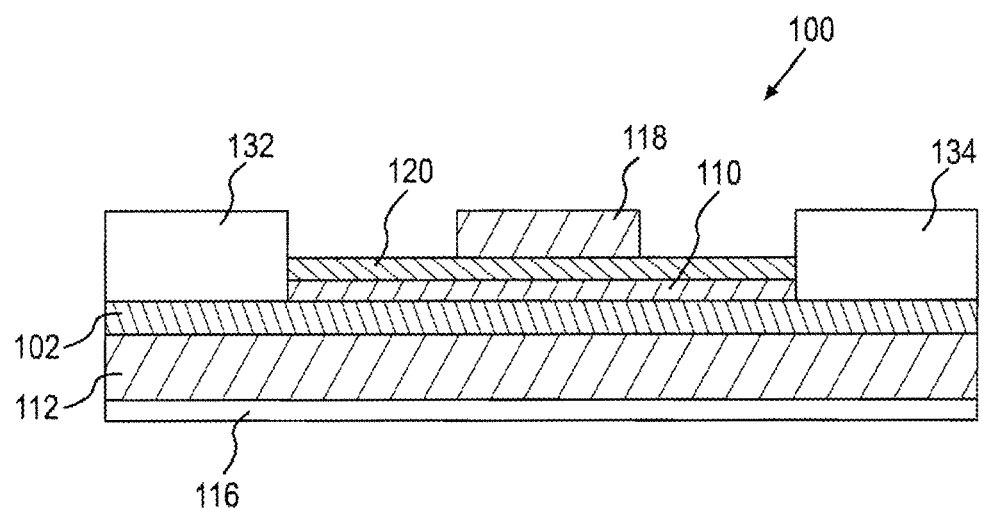
FIG. 1 illustrates an exemplary carbon nanotube (CNT) used in field effect transistors (FETs)

As noted above, carbon nanotube (CNT) field effect transistors (FETs) are promising candidates for future radio frequency (RF) applications because CNT FETs simultaneously offer high speed, high linearity, low power, and low noise attributes due to their unique one-dimensional semiconductor characteristics. FIG. 1 illustrates an exemplary CNT FET 100 that includes a source 132, a drain 134, a silicon dioxide layer 102, a silicon wafer 112, a gate dielectric 120, a top gate 118, a backgate 116, and CNTs 110. CNT FETs have a large impact in RF electronics applications where linearity is critical.

Figure 2:
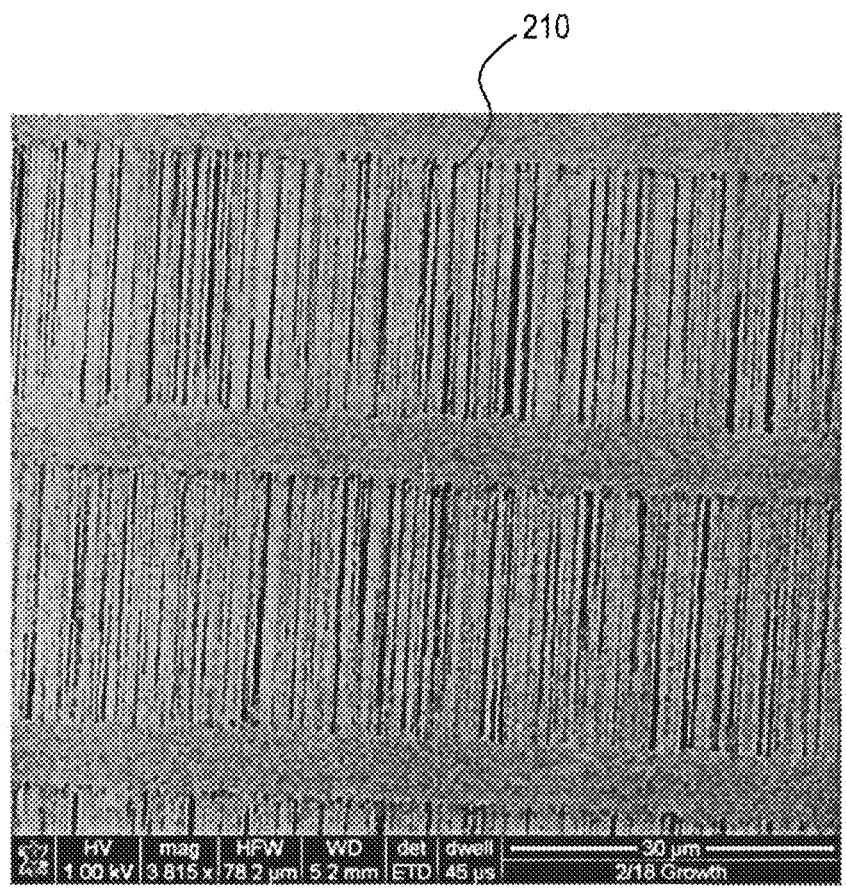
FIG. 2 illustrates exemplary arrays of CNTs grown on a ST-cut quartz wafer.

CNT FETs that use a single nanotube as a conduction channel may not form a usable RF device, due in part to the CNT's low current output and small active area. To form usable devices able to drive standard 50 ohm loads, many CNTs 210 may need to be placed in parallel within a single active device, as shown in FIG. 2. Large arrays of parallel, aligned CNTs 210 can be grown directly on a single crystal ST-cut quartz wafer (also referred to as crystalline quartz wafer or ST-cut quartz wafer) for manufacturing high speed FET devices (ST-cut is a particular crystal cut through crystalline quartz that is relatively stable over changes in temperature). Without the ST-cut quartz wafer, the CNTs 210 may not align along a preferred direction.

As noted above, when grown using a standard high-temperature chemical vapor deposition (CVD) based process, one third of the nucleating CNTs are metallic nanotubes whereas two thirds are semi-conducting nanotubes. Because the metallic nanotubes have conductance without having any transconductance, the metallic nanotubes are undesirable from a device standpoint, and should be removed. The standard method of removing these metallic nanotubes is to place or grow the CNTs on a thin oxide coating on a conductive wafer. The conductive wafer is then used as a global backgate to deplete the semi-conducting nanotubes before passing a large current through the metallic nanotubes. In an oxygen environment, this high current will oxidize the metallic nanotubes, preferentially leaving behind the depleted semi-conducting nanotubes.

In the current technology, the process of forming CNT FETs includes two parts. First, CNTs are grown in dense, aligned arrays on ST-cut quartz wafers using a standard, high temperature CVD growth process, as shown in FIG. 2. The ST-cut quartz wafers ensure that the CNTs will align along a preferred direction. However, these ST-cut quartz wafers are too thick to deplete the semi-conducting nanotubes through the use of a backgate. Therefore, in the second part of the process, the CNTs are taken from their growth substrate and transferred, using a complicated and messy transfer process, to a silicon wafer that has a thin layer of silicon oxide coating the surface so that the conductive silicon wafer can be used as a backgate to deplete semi-conducting nanotubes during electrical burnout. An example of such a process is shown in FIGS. 3A-3E.

Figure 3A:
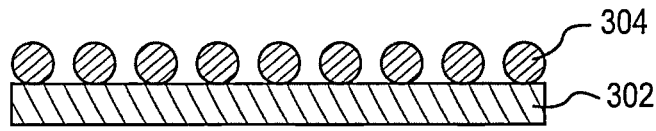
FIGS. 3A-3F illustrate a standard metallic nanotube removing process.

Referring to FIG. 3A, CNTs 304 are grown aligned on an ST-cut quartz wafer 302 (also referred to as the growth substrate) using a CVD growth process.

Figure 3B:
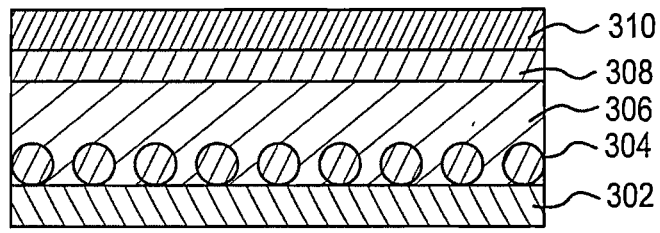

Referring FIG. 3B, the CNTs 304 are encased in a layer of gold 306. Next, a layer of polyimide 308 is spun on top of the gold 306, and a thermal release tape 310 is adhered to the polyimide 308.

Figure 3C:
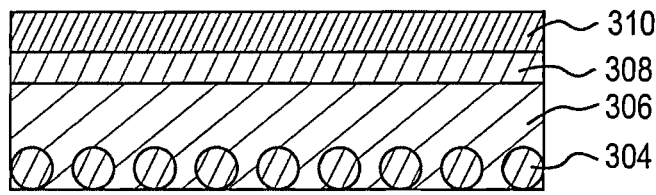
Figure 3C:

Referring to FIG. 3C, in order to remove the CNTs 304 from the growth substrate 302, the thermal release tape 310 is slowly peeled away from the ST-cut quartz wafer 302. The CNTs 304 preferentially adhere to the gold 306 instead of the ST-cut quartz wafer 302.

Figure 3D:
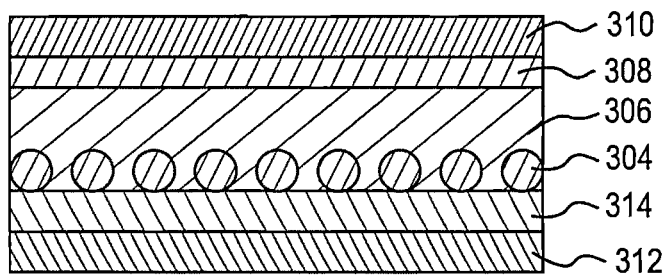

Referring to FIG. 3D, the entire stack of material (including the thermal release tape 310, the polyimide 308, and CNTs 304 encased in gold 306) is physically pressed onto another wafer (shown as 312, 314, also referred to as the donor wafer or conductive wafer). The donor wafer is typically a doped silicon wafer 312 (also referred to as the heavily doped silicon wafer, silicon wafer, or Si wafer) with a thin layer of $SiO_2$ 314 coating the top surface of the silicon wafer 312.

Figure 3E:
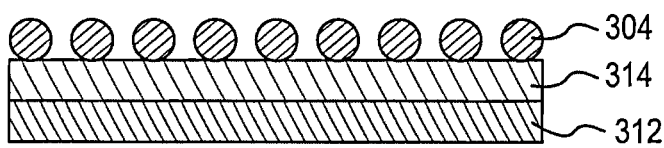

Referring to FIG. 3E, the thermal release tape 310 is removed using a hotplate, the polyimide 308 is removed using an $O_2$ plasma etch, and the gold 306 is removed using potassium iodide. The CNTs 304 are left aligned on the surface of the donor wafer 312, 314.

Figure 3F:
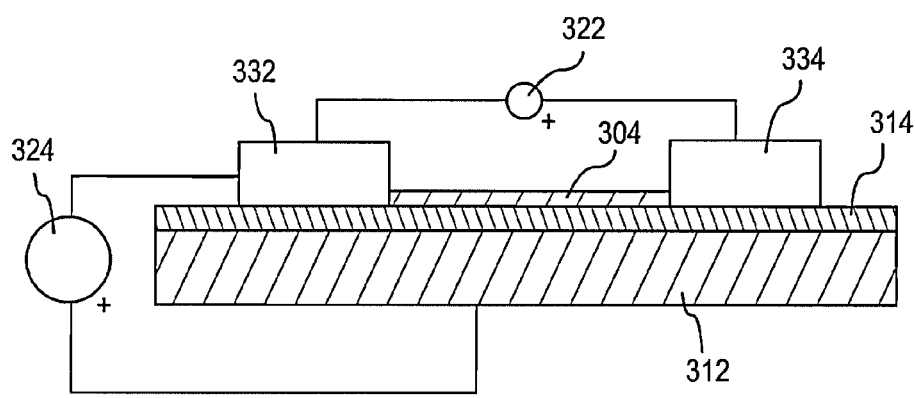

Once transferred onto the donor wafer 312, 314, the metallic nanotubes removal process can be performed using a standard backgate electrical burnout process, as shown in FIG. 3F. The backgate electrical burnout process is accomplished by depleting the semi-conducting nanotubes of the CNTs 304 using a backgate voltage and then pulsing the source-drain voltage to preferentially burnout the metallic nanotubes of the CNTs 304.

Specifically, FIG. 3F shows a source 332, a drain 334, a backgate voltage $V_{bg}$ 324 that connects the source 332 and the heavily doped silicon wafer 312, and a source drain voltage $V_{ds}$ 322. First, the backgate voltage $V_{bg}$ 324 is applied, effectively producing a gate bias to the CNTs 304 to turn off the CNTs 304 so that the semi-conducting nanotubes of the CNTs 304 will not conduct current but the metallic nanotubes of the CNTs 304 will conduct current. Next, the second voltage $V_{ds}$ 322 is applied to burnout the metallic nanotubes of the CNTs 304.

Embodiments of a method and apparatus for removing metallic nanotubes without transferring CNTs from one substrate to another substrate provide two methods of transferring a thin layer of crystalline ST-cut quartz wafer to the surface of a carrier silicon wafer for subsequent CNT growth, without resorting to CNT transfer. In other words, embodiments of a method and apparatus allow CNTs to be grown on the same substrate that metallic nanotube removal is performed, therefore eliminating the costly and messy step of transferring CNTs from one substrate to another. This is achieved through a residual thin layer of crystalline ST-cut quartz on a silicon wafer. The ST-cut quartz wafer promotes aligned growth of CNTs, while the underlying silicon wafer allows backgate burnout.

In an embodiment of the first method, a quartz wafer may be bonded to a silicon wafer using a Van der Waals bond. Once bonded, the wafer pair may then be annealed to strengthen the bond across the interface. The ST-cut quartz wafer may then be ground, lapped, and polished until only a very thin layer remains on the surface (50-100 μm). This thin layer may be reduced even further using, for example, a deep reactive ion etch method, to approximately 10 microns thick. The surface may then be polished to remove any residual roughness from the thinning processes. This thin transferred layer of ST-cut quartz wafer will allow the growth of aligned CNTs. Because the ST-cut quartz wafer is very thin, the silicon wafer can be used as a backgate to deplete the semi-conducting nanotubes and allow the electrical burnout of the metallic nanotubes.

In an embodiment of the second method, the ST-cut quartz wafer may be first implanted with $H_2$ and He to a desired depth before using, for example, a Van der Waals bond to bond the ST-cut quartz wafer to a silicon wafer. Again, the wafer pair may be annealed to strengthen the bond across the interface. When heated to approximately 400° C., the ST-cut quartz wafer will cleave along the implanted doping profile, leaving behind a very thin layer of crystalline quartz. The surface may then be polished to remove any roughness. Again, this top layer of ST-cut quartz wafer will allow aligned CNT growth, and the silicon wafer can be used as a backgate to deplete the semi-conducting nanotubes and allow the electrical burnout of the metallic nanotubes.

Figure 4A:
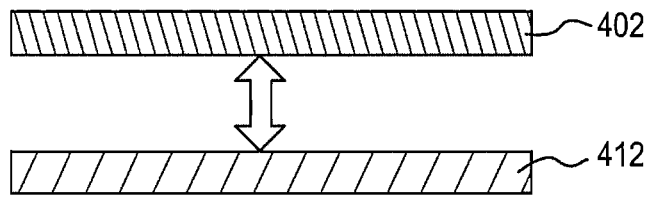
FIGS. 4A-4G illustrate an embodiment of a first method for removing metallic nanotubes without transferring CNTs from one substrate to another substrate.

FIGS. 4A-4G illustrate an embodiment of the first method for removing metallic nanotubes without transferring CNTs from one substrate to another substrate. FIG. 4A shows an ST-cut quartz wafer 402 and a silicon wafer 412.

Figure 4B:
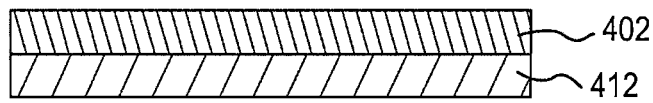

Referring to FIG. 4B, the ST-cut quartz wafer 402 is bonded to the silicon wafer 412 using, for example, a Van der Waals bond. Demonstration of this Van der Waals bond between ST-cut quartz and silicon have shown combined wafers with usable areas covering in excess of 95 percent of the surface area. One skilled in the art will appreciate that other types of bonding method may be used to bond the ST-cut quartz wafer 402 and the silicon wafer 412. The two wafers 402, 412 are annealed at, for example, 200° C. for 60 hours, to strengthen the bond between the two wafers 402, 412. One skilled in the art will appreciate that other temperatures and durations may equally be applied.

Figure 4C:
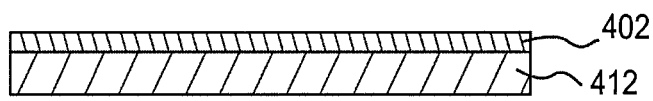

Referring to FIG. 4C, the ST-cut quartz wafer 402 is ground, lapped, and polished until the remaining wafer thickness is approximates 50 to 100 microns, for example. One skilled in the art will appreciate that other thicknesses can equally be applied.

Figure 4D:
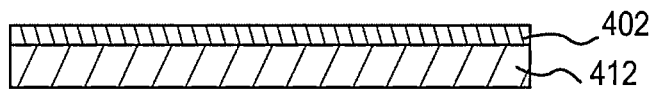

Referring to FIG. 4D, a deep reactive ion etch (DRIE) may be used to thin the remaining ST-cut quartz wafer 402 down to 10 microns or thinner, for example. One skilled in the art will appreciate that other thicknesses can equally be applied.

Figure 4E:
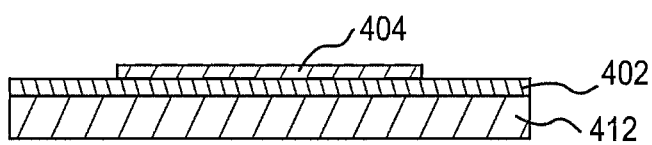

Referring to FIG. 4E, standard aligned nanotube growth techniques may be used to deposit catalyst and grow CNTs 404 on the top surface of the ST-cut quartz wafer 402.

Figure 4F:
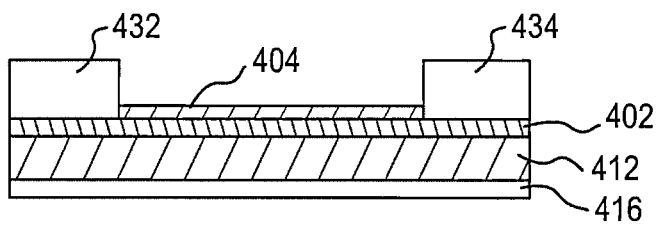

Referring to FIG. 4F, a source (e.g., palladium) contact 432 (also referred to as source) and a drain (e.g., palladium) contact 434 (also referred to as drain) may be deposited on the CNTs 404. A metallic backgate 416 (also referred to as metallic gate or backgate) may be deposited on the bottom surface of the silicon wafer 412. The backgate 416 enhances contact to the silicon wafer 412 and prevents the silicon from oxidizing.

Figure 4G:
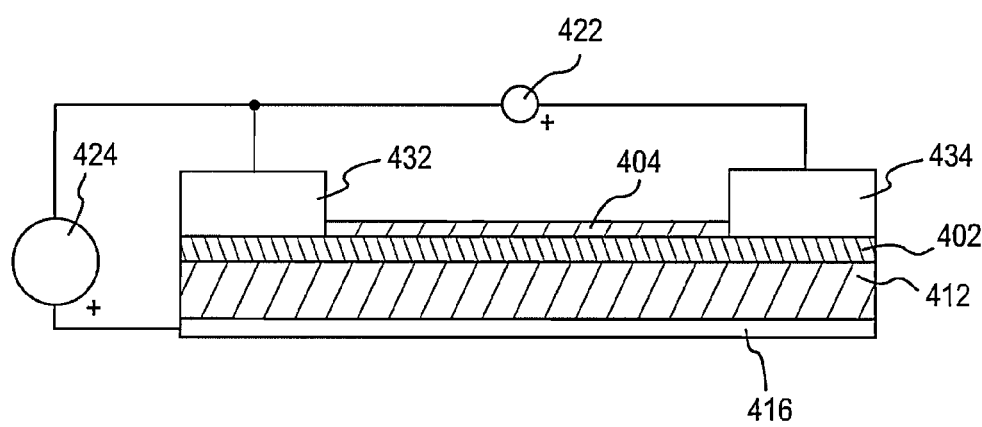

FIG. 4G shows a backgate voltage $V_{bg}$ 424 that connects the source 432 to the metallic backgate 416 and a source drain voltage $V_{ds}$ 422 that connects the source 432 to the drain 434. First, the backgate voltage $V_{bg}$ 424 is applied, effectively producing a gate bias to the CNTs 404 to turn off the CNTs 404 so that the semi-conducting nanotubes of the CNTs 404 will not conduct current but the metallic nanotubes of the CNTs 404 will conduct current. Next, the source drain voltage $V_{ds}$ 422 is applied to burnout the metallic nanotubes of the CNTs 404.

Figure 5A:
FIGS. 5A-5G illustrate an embodiment of a second method for removing metallic nanotubes without transferring CNTs from one substrate to another substrate.

FIGS. 5A-5G illustrate an embodiment of the second method for removing metallic nanotubes without transferring CNTs from one substrate to another substrate. Referring to FIG. 5A, $H_2$ and He ions are implanted to a proper depth on an ST-cut quartz wafer 502. One skilled in the art will appreciate different implant species and conditions may be applied.

Figure 5B:
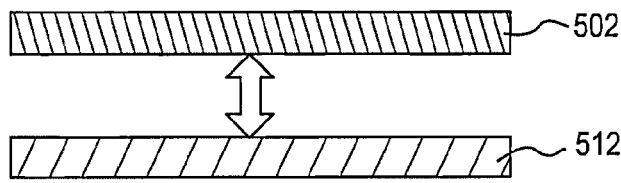

Referring to FIG. 5B, the ST-cut quartz wafer 502 is bonded implant side down to a silicon wafer 512 using, for example, a Van der Waals bond. One skilled in the art will appreciate that other types of bonding methods can be used to bond the ST-cut quartz wafer 502 and the silicon wafer 512.

Figure 5C:
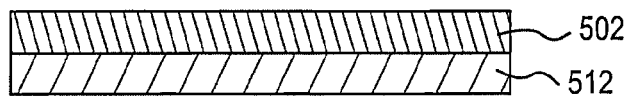

Referring to FIG. 5C, the two wafers 502, 512 are annealed at, for example, 200° C. for 60 hours, to strengthen the bond between the two wafers 502, 512. One skilled in the art will appreciate that other temperatures and durations may equally be applied.

Figure 5D:
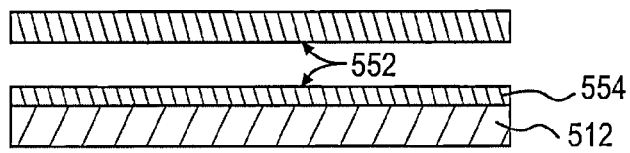
Figure 6:
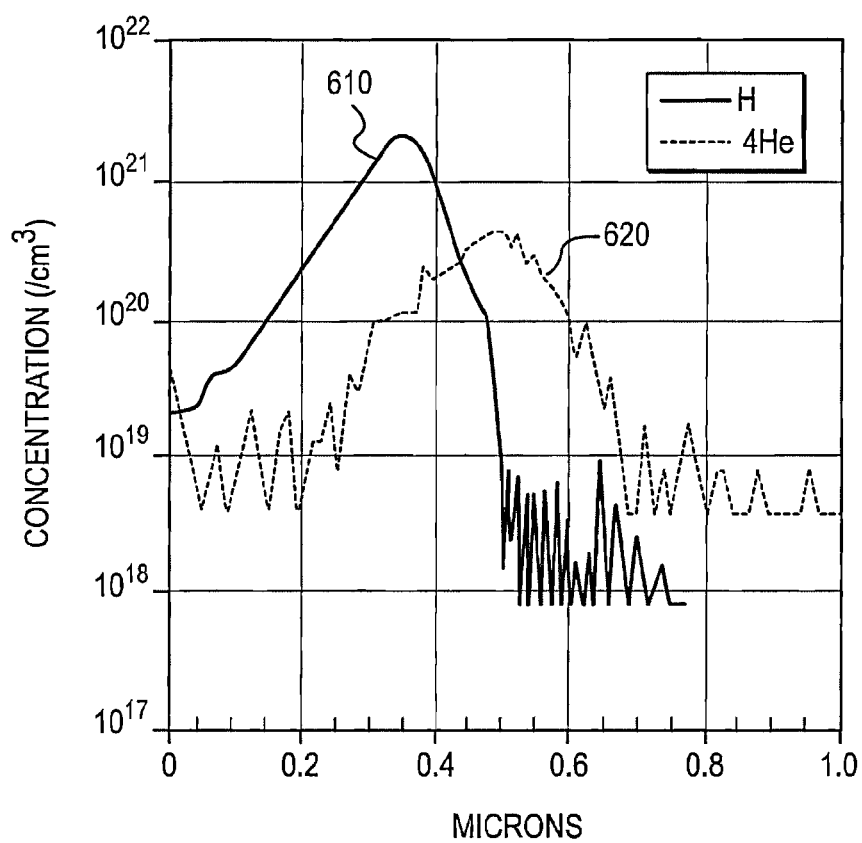
FIG. 6 illustrates a sample ion implant profile used to prepare the ST-cut quartz wafer shown in FIGS. 5A-5G.

Referring to FIG. 5D, the wafers 502, 512 are heated to, for example, 400° C. to allow the ST-cut quartz wafer 502 to cleave along the implant profile 552 of the $H_2$ and He ions. The implant profile shows the concentration of both $H_2$ and He within the wafer as a function of surface depth. The implant of both species is performed using a standard ion implanter where the main tunable parameters are the accelerated energy of the particles and the total integrated dose. By varying the implant energy, the peak concentration of the species within the wafer can be changed in depth. In general, increasing the implant energy will move the peak of the concentration profile deeper within the wafer and reducing the implant energy will move the peak toward the surface of the wafer. The break typically occurs between the $H_2$ and He peaks, as shown in FIG. 6, leaving an approximately 100-400 nanometers thick layer of crystalline quartz wafer 554 bonded to the silicon wafer 512. The fracture depth can be decreased by reducing the implant energy of each particle species to bring the two peaks closer to the surface of the wafer. The top surface of the ST-cut quartz 554 is then polished and further thinned using a chemical mechanical polisher (CMP). One skilled in the art will appreciate that other thicknesses may equally be applied.

Figure 5E:
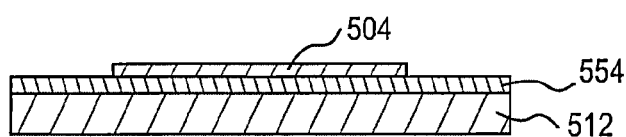

Referring to FIG. 5E, standard aligned nanotube growth techniques may be used to deposit catalyst and grow CNTs 504 on the top surface of the ST-cut quartz wafer 554.

Figure 5F:
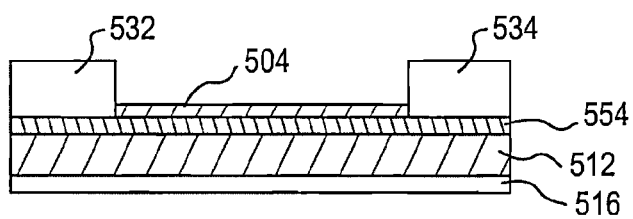

Referring to FIG. 5F, a source (e.g., palladium) contact 532 (also referred to as source) and a drain (e.g., palladium) contact 534 (also referred to as drain) may be deposited on the CNTs 504. A metallic backgate 516 (also referred to as metallic gate or backgate) may be deposited on the bottom surface of the silicon wafer 512. The backgate 516 enhances contact to the silicon wafer 512 and prevents the silicon from oxidizing.

Figure 5G:
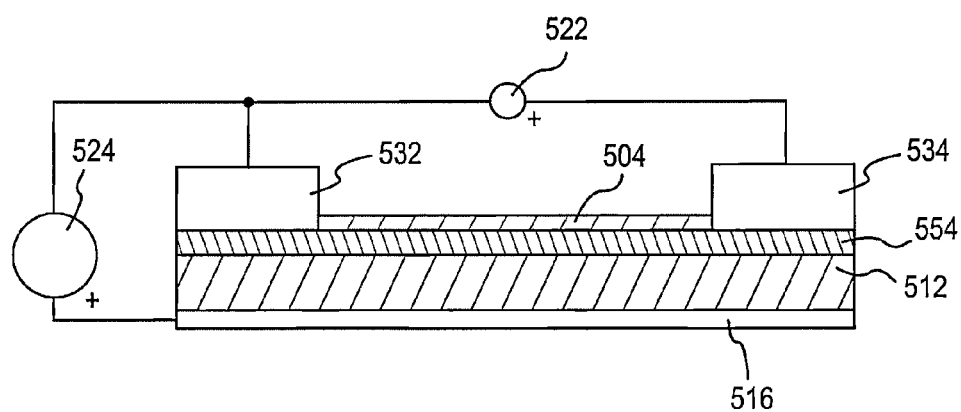

FIG. 5G shows a backgate voltage $V_{bg}$ 524 that connects the source 532 to the metallic backgate 516 and a source drain voltage $V_{ds}$ 522 that connects the source 532 to the drain 534. First, the backgate voltage $V_{bg}$ 524 is applied, effectively producing a gate bias to the CNTs 504 to turn off the CNTs 504 so that the semi-conducting nanotubes of the CNTs 504 will not conduct current (the semi-conducting nanotubes are depleted) but the metallic nanotubes of the CNTs 504 will conduct current. Next, the source drain voltage $V_{ds}$ 522 is applied to burnout the metallic nanotubes of the CNTs 504.

FIG. 6 illustrates a sample ion implant profile used to prepare the ST-cut quartz wafer 502 shown in FIGS. 5A-5G. The ST-cut quartz wafer 502 typically cleaves between the $H_2$ peak 610 and the He peak 620, leaving an approximately 100-400 nanometers thick layer of crystalline quartz wafer 554 bonded to the silicon wafer 512. One skilled in the art will appreciate that other thicknesses may equally be applied.

Figure 7:
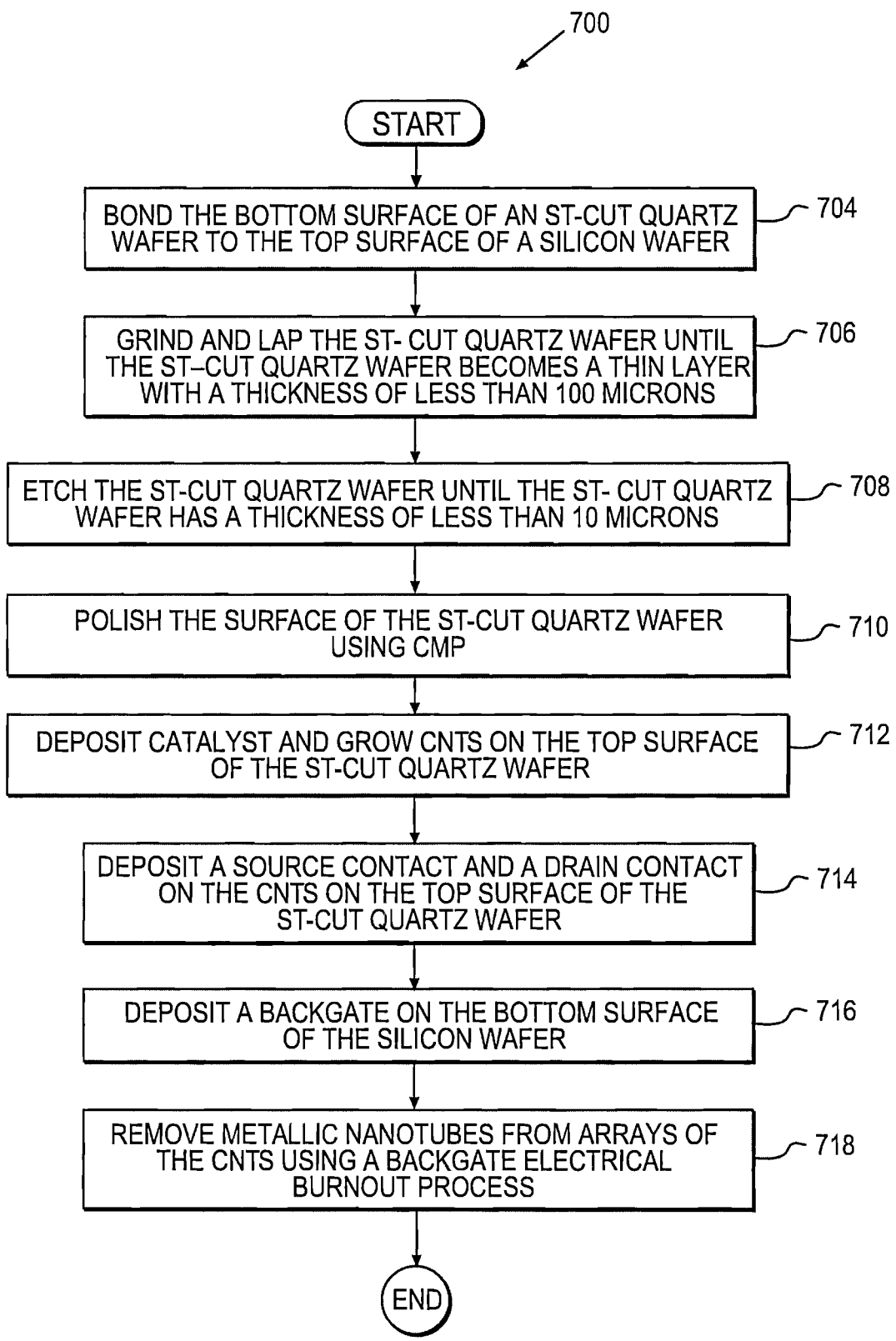
FIG. 7 is a flow chart illustrating an embodiment of the first method for removing metallic nanotubes without transferring CNTs from one substrate to another substrate.

FIG. 7 is a flow chart illustrating an embodiment of method 700 for removing metallic nanotubes without transferring CNTs from one substrate to another substrate. Method 700 bonds an ST-cut quartz wafer to a silicon wafer (block 704). Method 700 then grinds and laps the ST-cut quartz wafer until the ST-cut quartz wafer becomes a thin layer with a thickness of less than 100 microns (block 706) and etches the ST-cut quartz wafer using a DRIE until the ST-cut quartz wafer has a thickness of less than 10 microns (block 708). The top surface of the ST-cut quartz is then polished using a CMP (block 710). Next, method 700 deposits catalyst and grows CNTs on the top surface of the ST-cut quartz wafer (block 712), deposits a source contact and a drain contact on the CNTs on the top surface of the ST-cut quartz wafer (block 714), and deposits a backgate on the bottom surface of the silicon wafer (block 716). Finally, method 700 removes metallic nanotubes from arrays of the CNTs using a backgate electrical burnout process (block 718). The CNTs are grown on a same substrate that metallic nanotube removal is performed, eliminating the process of transferring the CNTs from one substrate to another substrate.

Figure 8:
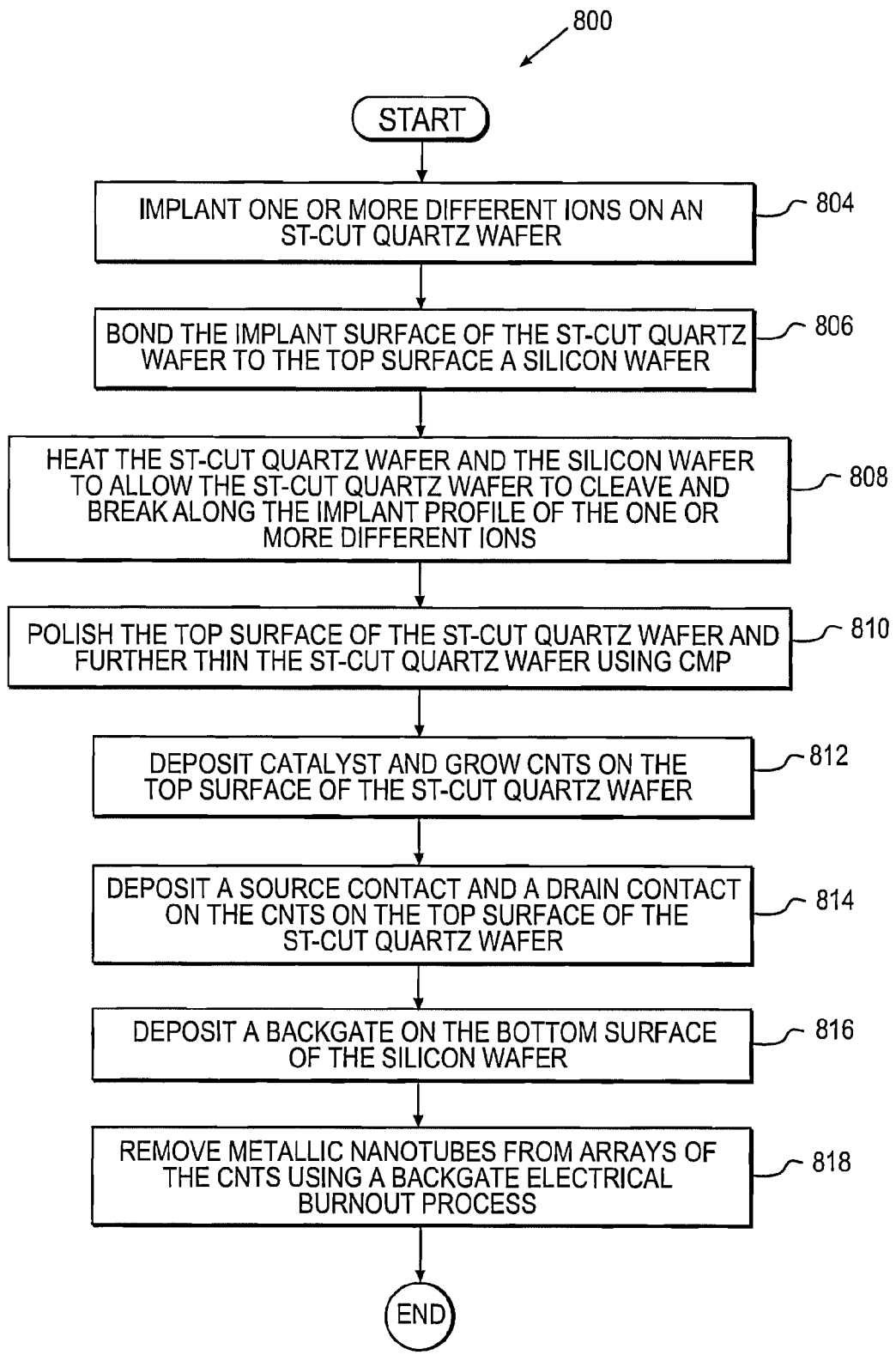
FIG. 8 is a flow chart illustrating an embodiment of the second method for removing metallic nanotubes without transferring CNTs from one substrate to another substrate.

FIG. 8 is a flow chart illustrating an embodiment of method 800 for removing metallic nanotubes without transferring CNTs from one substrate to another substrate. Method 800 first implants one or more different ions into an ST-cut quartz wafer (block 804). Method 800 then bonds the ST-cut quartz wafer to a silicon wafer (block 806). The implant surface of the ST-cut quartz wafer is bonded to the top surface of the silicon wafer. Method 800 then heats the ST-cut quartz wafer and the silicon wafer to allow the ST-cut quartz wafer to cleave and break along the implant profile of the one or more different ions (block 808). The top surface of the cleaved ST-cut quartz is then polished and further thinned using a CMP (block 810). Next, method 800 deposits catalyst and grows CNTs on the top surface of the ST-cut quartz wafer (block 812), deposits a source contact and a drain contact on the CNTs on the top surface of the ST-cut quartz wafer (block 814), and deposits a backgate on the bottom surface of the silicon wafer (block 816). Finally, method removes metallic nanotubes from arrays of the CNTs using a backgate electrical burnout process (block 818). The CNTs are grown on the same substrate that metallic nanotube removal is performed, eliminating the process of transferring the CNTs from one substrate to another substrate.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An apparatus for removing metallic nanotubes without transferring carbon nanotubes (CNTs) from one substrate to another substrate, comprising:
    a silicon wafer;
    a thin layer of quartz wafer bonded to the silicon wafer on the top surface of the silicon wafer;
    a plurality of CNTs grown on the thin layer of quartz wafer;
    a source contact and a drain contact deposited on the plurality of CNTs; and
    a metallic gate deposited on the bottom surface of the silicon wafer,
    wherein the apparatus is configured so that metallic nanotubes of the plurality of CNTs are removed using a backgate electrical burnout process and the plurality of CNTs have been grown on a same substrate on which metallic nanotube removal is performed, eliminating the process of transferring the CNTs from one substrate to another substrate.

2. The apparatus of claim 1, wherein the thin layer of quartz wafer is formed by:
    implanting $H_2$ and He ions on the quartz wafer before bonding the quartz wafer to the silicon wafer, wherein the implant surface of the quartz wafer is bonded to the top surface of the silicon wafer; and
    heating the quartz wafer and the silicon wafer to allow the quartz wafer to cleave and break along an implant profile of the $H_2$ and He ions.

3. The apparatus of claim 1, wherein the thin layer of quartz wafer is formed by:
    grinding and lapping the quartz wafer after bonding the quartz wafer to the silicon wafer until the quartz wafer becomes a thin layer with a thickness of less than 100 microns; and
    etching the quartz wafer until the quartz wafer has a thickness of less than 10 microns.

4. The apparatus of claim 1, wherein a top surface of the quartz wafer is polished before the CNTs are grown on the quartz wafer.

5. The apparatus of claim 1, wherein the quartz wafer bonded to the silicon wafer is an ST-cut quartz wafer.

6. The apparatus of claim 1, wherein the quartz wafer is bonded to the silicon wafer via a Van der Waals bond.

7. The apparatus of claim 2, wherein a top surface of the quartz wafer is polished before the CNTs are grown on the quartz wafer.

8. The apparatus of claim 2, wherein the quartz wafer bonded to the silicon wafer is an ST-cut quartz wafer.

9. The apparatus of claim 2, wherein the quartz wafer is bonded to the silicon wafer via a Van der Waals bond.

10. The apparatus of claim 3, wherein a top surface of the quartz wafer is polished before the CNTs are grown on the quartz wafer.

11. The apparatus of claim 3, wherein the quartz wafer bonded to the silicon wafer is an ST-cut quartz wafer.

12. The apparatus of claim 3, wherein the quartz wafer is bonded to the silicon wafer via a Van der Waals bond.

* * * * *